United States Patent
Kim et al.

(10) Patent No.: US 11,529,956 B2
(45) Date of Patent: Dec. 20, 2022

(54) APPARATUS AND METHOD FOR CONTROLLING DRIVING IN VEHICLE

(71) Applicants: HYUNDAI MOTOR COMPANY, Seoul (KR); KIA MOTORS CORPORATION, Seoul (KR)

(72) Inventors: Beom Jun Kim, Seoul (KR); Hoi Won Kim, Gwacheon-si (KR); Jae Yong Jeon, Hwaseong-si (KR); Dong Eon Oh, Seoul (KR); Dae Young Kim, Gwangmyeong-si (KR); Chan Il Park, Chungcheongbuk-do (KR); Jin Su Jeong, Suwon-si (KR); Doo Jin Um, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 129 days.

(21) Appl. No.: 16/376,612

(22) Filed: Apr. 5, 2019

(65) Prior Publication Data
US 2019/0315365 A1    Oct. 17, 2019

Related U.S. Application Data

(60) Provisional application No. 62/655,831, filed on Apr. 11, 2018.

(30) Foreign Application Priority Data

Nov. 15, 2018  (KR) .................. 10-2018-0140866

(51) Int. Cl.
*B60W 30/18*  (2012.01)
*B60W 50/10*  (2012.01)
*B60W 50/14*  (2020.01)

(52) U.S. Cl.
CPC ...... *B60W 30/18163* (2013.01); *B60W 50/10* (2013.01); *B60W 50/14* (2013.01)

(58) Field of Classification Search
CPC .......... B60W 30/18163; B60W 50/14; B60W 50/10; B60W 2050/0068;
(Continued)

(56) References Cited

U.S. PATENT DOCUMENTS 4,361,202 A   11/1982  Minovitch
5,314,037 A   5/1994   Yang
(Continued)

FOREIGN PATENT DOCUMENTS

DE   198 21 122 A1   6/1999
DE   101 14 187 A1   9/2002
(Continued)

OTHER PUBLICATIONS

European Search Report dated Mar. 27, 2020 from the corresponding European Application No. 19167264.1, 8 pages.
(Continued)

*Primary Examiner* — Abby Y Lin
*Assistant Examiner* — Danielle Marie Jackson
(74) *Attorney, Agent, or Firm* — Morgan, Lewis & Bockius LLP (57) ABSTRACT

An apparatus for controlling driving in a vehicle is provided. The apparatus includes one or more input devices configured to receive an input from a driver of the vehicle and a control circuit electrically connected with the one or more input devices. The control circuit is configured to activate a lane change when a first input for the lane change is received via the one or more input devices, initiate a lateral movement for the lane change when a second input for the lane change is received via the one or more input devices within a first time interval after the first input, and cancel the lane change when (Continued)

the second input is not received within the first time interval after the first input.

18 Claims, 7 Drawing Sheets

(58) Field of Classification Search
CPC ........... B60W 2050/146; B60W 30/18; B60W 50/08; B60W 2050/143; G08G 1/167
See application file for complete search history.

(56) References Cited

U.S. PATENT DOCUMENTS

| | | | |
|---|---|---|---|
| 5,521,579 A | 5/1996 | Bernhard | |
| 6,055,467 A | 4/2000 | Mehring et al. | |
| 6,473,678 B1 | 10/2002 | Satoh et al. | |
| 6,842,687 B2 | 1/2005 | Winner et al. | |
| 7,363,140 B2 | 4/2008 | Ewerhart et al. | |
| 7,821,421 B2 | 10/2010 | Tamir et al. | |
| 8,073,595 B2 | 12/2011 | Tabata et al. | |
| 8,457,827 B1 | 6/2013 | Ferguson et al. | |
| 8,521,352 B1 | 8/2013 | Ferguson et al. | |
| 8,798,841 B1 | 8/2014 | Nickolaou et al. | |
| 8,874,301 B1 | 10/2014 | Rao et al. | |
| 9,014,919 B2 | 4/2015 | Kim | |
| 9,079,571 B2 | 7/2015 | Trost et al. | |
| 9,134,731 B2 | 9/2015 | Healey et al. | |
| 9,315,178 B1 | 4/2016 | Ferguson et al. | |
| 9,527,441 B2 | 12/2016 | Matsumura | |
| 9,682,708 B2 | 6/2017 | Maruyama | |
| 9,682,725 B2 | 6/2017 | Yamaoka | |
| 9,874,871 B1 | 1/2018 | Zhu et al. | |
| 10,131,356 B2 | 11/2018 | Takae | |
| 10,152,883 B2 | 12/2018 | Fujimaki | |
| 10,183,668 B2 | 1/2019 | Takae | |
| 10,202,123 B2 | 2/2019 | Aoki | |
| 10,259,459 B2 | 4/2019 | Takae | |
| 10,286,907 B2 | 5/2019 | Nishiguchi et al. | |
| 10,324,463 B1 | 6/2019 | Konrardy et al. | |
| 10,449,856 B2 | 10/2019 | Kojima | |
| 10,449,971 B2 | 10/2019 | Arakawa et al. | |
| 10,451,730 B2 * | 10/2019 | Talamonti | G02B 27/01 |
| 10,509,406 B2 | 12/2019 | Choi et al. | |
| 10,558,213 B2 | 2/2020 | Sato et al. | |
| 10,618,523 B1 | 4/2020 | Fields et al. | |
| 10,627,813 B2 | 4/2020 | Tsuji et al. | |
| 10,663,971 B2 | 5/2020 | Sugawara et al. | |
| 10,676,084 B2 | 6/2020 | Fujii | |
| 10,689,005 B2 | 6/2020 | Oishi et al. | |
| 10,713,952 B2 | 7/2020 | Ogawa et al. | |
| 10,814,913 B2 * | 10/2020 | Fujii | G05D 1/0212 |
| 10,935,974 B1 | 3/2021 | Fields et al. | |
| 2003/0163239 A1 | 8/2003 | Winner et al. | |
| 2005/0137782 A1 | 6/2005 | Shinada | |
| 2005/0228588 A1 | 10/2005 | Braeuchle et al. | |
| 2005/0256630 A1 | 11/2005 | Nishira et al. | |
| 2006/0009910 A1 | 1/2006 | Ewerhart et al. | |
| 2007/0043505 A1 | 2/2007 | Leicht | |
| 2007/0255474 A1 | 11/2007 | Hayakawa et al. | |
| 2008/0172153 A1 | 7/2008 | Ozaki et al. | |
| 2008/0204212 A1 * | 8/2008 | Jordan | B60Q 1/38 340/438 |
| 2009/0005933 A1 | 1/2009 | Tabata et al. | |
| 2009/0088925 A1 | 4/2009 | Sugawara et al. | |
| 2009/0132125 A1 | 5/2009 | Yonezawa et al. | |
| 2009/0171533 A1 | 7/2009 | Kataoka | |
| 2009/0194350 A1 | 8/2009 | Rattapon et al. | |
| 2009/0299573 A1 | 12/2009 | Thrun et al. | |
| 2009/0319113 A1 | 12/2009 | Lee | |
| 2010/0010733 A1 | 1/2010 | Krumm | |
| 2010/0042282 A1 | 2/2010 | Taguchi et al. | |
| 2010/0289632 A1 | 11/2010 | Seder et al. | |
| 2011/0169625 A1 | 7/2011 | James et al. | |
| 2011/0196592 A1 | 8/2011 | Kashi et al. | |
| 2011/0241862 A1 | 10/2011 | Debouk et al. | |
| 2011/0251758 A1 | 10/2011 | Kataoka | |
| 2011/0293145 A1 | 12/2011 | Nogami et al. | |
| 2012/0166032 A1 | 6/2012 | Lee et al. | |
| 2012/0283907 A1 | 11/2012 | Lee et al. | |
| 2012/0296522 A1 | 11/2012 | Otuka | |
| 2013/0063595 A1 | 3/2013 | Niem | |
| 2013/0066525 A1 | 3/2013 | Tomik et al. | |
| 2013/0226406 A1 | 8/2013 | Ueda et al. | |
| 2013/0253793 A1 | 9/2013 | Lee et al. | |
| 2014/0074356 A1 | 3/2014 | Bone | |
| 2014/0309855 A1 * | 10/2014 | Tran | B60Q 1/38 701/36 |
| 2014/0336896 A1 | 11/2014 | Udaka et al. | |
| 2015/0006012 A1 | 1/2015 | Kammel et al. | |
| 2015/0006013 A1 * | 1/2015 | Wimmer | B60W 50/14 701/23 |
| 2015/0019063 A1 | 1/2015 | Lu et al. | |
| 2015/0094899 A1 | 4/2015 | Hackenberg et al. | |
| 2015/0148985 A1 | 5/2015 | Jo | |
| 2015/0166062 A1 | 6/2015 | Johnson et al. | |
| 2015/0204687 A1 | 7/2015 | Yoon et al. | |
| 2015/0353082 A1 | 12/2015 | Lee et al. | |
| 2015/0355641 A1 | 12/2015 | Choi et al. | |
| 2015/0360721 A1 | 12/2015 | Matsuno et al. | |
| 2016/0001781 A1 | 1/2016 | Fung et al. | |
| 2016/0091897 A1 | 3/2016 | Nilsson et al. | |
| 2016/0107682 A1 | 4/2016 | Tan et al. | |
| 2016/0107687 A1 | 4/2016 | Yamaoka | |
| 2016/0187879 A1 | 6/2016 | Mere et al. | |
| 2016/0225261 A1 | 8/2016 | Matsumoto | |
| 2016/0250968 A1 | 9/2016 | Shirakata et al. | |
| 2016/0272204 A1 | 9/2016 | Takahashi et al. | |
| 2016/0288707 A1 | 10/2016 | Matsumura | |
| 2016/0297431 A1 | 10/2016 | Eigel et al. | |
| 2016/0297447 A1 | 10/2016 | Suzuki | |
| 2016/0339913 A1 | 11/2016 | Yamashita et al. | |
| 2016/0349066 A1 | 12/2016 | Chung et al. | |
| 2016/0368492 A1 | 12/2016 | Al-Stouhi | |
| 2017/0003683 A1 | 1/2017 | Sato et al. | |
| 2017/0061799 A1 | 3/2017 | Fujii et al. | |
| 2017/0108865 A1 | 4/2017 | Rohde et al. | |
| 2017/0124882 A1 | 5/2017 | Wang | |
| 2017/0148327 A1 | 5/2017 | Sim | |
| 2017/0171375 A1 | 6/2017 | Kamata | |
| 2017/0183007 A1 | 6/2017 | Oh et al. | |
| 2017/0197637 A1 | 7/2017 | Yamada et al. | |
| 2017/0203763 A1 | 7/2017 | Yamada et al. | |
| 2017/0203764 A1 | 7/2017 | Fujiki et al. | |
| 2017/0240172 A1 | 8/2017 | Nishiguchi et al. | |
| 2017/0240186 A1 | 8/2017 | Hatano | |
| 2017/0243491 A1 | 8/2017 | Fujii et al. | |
| 2017/0291603 A1 | 10/2017 | Nakamura | |
| 2017/0308094 A1 | 10/2017 | Abe et al. | |
| 2017/0313313 A1 | 11/2017 | Asakura | |
| 2017/0315556 A1 | 11/2017 | Mimura | |
| 2017/0334460 A1 | 11/2017 | Arakawa et al. | |
| 2017/0341652 A1 | 11/2017 | Sugawara et al. | |
| 2017/0341653 A1 | 11/2017 | Kubota et al. | |
| 2017/0349212 A1 | 12/2017 | Oshida et al. | |
| 2017/0368936 A1 | 12/2017 | Kojima | |
| 2018/0009437 A1 | 1/2018 | Ooba | |
| 2018/0029604 A1 | 2/2018 | Niino et al. | |
| 2018/0033309 A1 | 2/2018 | Norwood | |
| 2018/0037260 A1 | 2/2018 | Otake et al. | |
| 2018/0043906 A1 | 2/2018 | Huang | |
| 2018/0046185 A1 | 2/2018 | Sato et al. | |
| 2018/0050659 A1 | 2/2018 | Coburn | |
| 2018/0074497 A1 | 3/2018 | Tsuji et al. | |
| 2018/0088574 A1 | 3/2018 | Latotzki et al. | |
| 2018/0091085 A1 | 3/2018 | Tamagaki et al. | |
| 2018/0111628 A1 | 4/2018 | Tamagaki et al. | |
| 2018/0154939 A1 | 6/2018 | Aoki | |
| 2018/0157038 A1 | 6/2018 | Kabe | |
| 2018/0162416 A1 | 6/2018 | Honda et al. | |
| 2018/0170370 A1 | 6/2018 | Kataoka | |
| 2018/0178713 A1 | 6/2018 | Fujii | |
| 2018/0178714 A1 | 6/2018 | Fujii | |
| 2018/0178715 A1 | 6/2018 | Fujii | |
| 2018/0178716 A1 | 6/2018 | Fujii | |

(56) References Cited

U.S. PATENT DOCUMENTS

| | | |
|---|---|---|
| 2018/0178801 A1 | 6/2018 | Hashimoto et al. |
| 2018/0178802 A1* | 6/2018 | Miyata ................ B60W 10/06 |
| 2018/0186376 A1 | 7/2018 | Lee et al. |
| 2018/0188735 A1 | 7/2018 | Sugawara et al. |
| 2018/0194280 A1 | 7/2018 | Shibata et al. |
| 2018/0197414 A1 | 7/2018 | Oooka |
| 2018/0209801 A1 | 7/2018 | Stentz et al. |
| 2018/0215387 A1 | 8/2018 | Takae |
| 2018/0215388 A1 | 8/2018 | Takae |
| 2018/0222422 A1 | 8/2018 | Takae |
| 2018/0222423 A1 | 8/2018 | Takae et al. |
| 2018/0237030 A1 | 8/2018 | Jones et al. |
| 2018/0239352 A1 | 8/2018 | Wang et al. |
| 2018/0251155 A1 | 9/2018 | Chan et al. |
| 2018/0257669 A1 | 9/2018 | Makke |
| 2018/0281788 A1 | 10/2018 | Uchida |
| 2018/0290666 A1 | 10/2018 | Ichikawa et al. |
| 2018/0292820 A1 | 10/2018 | Markberger |
| 2018/0297638 A1 | 10/2018 | Fujii |
| 2018/0297639 A1 | 10/2018 | Fujii |
| 2018/0297640 A1 | 10/2018 | Fujii |
| 2018/0339708 A1 | 11/2018 | Geller |
| 2018/0345959 A1 | 12/2018 | Fujii |
| 2018/0345960 A1 | 12/2018 | Fujii |
| 2018/0345964 A1 | 12/2018 | Fujii et al. |
| 2018/0346027 A1 | 12/2018 | Fujii |
| 2018/0348758 A1 | 12/2018 | Nakamura et al. |
| 2018/0350242 A1 | 12/2018 | Fujii |
| 2018/0354519 A1 | 12/2018 | Miyata |
| 2018/0362013 A1 | 12/2018 | Ungermann |
| 2018/0370542 A1 | 12/2018 | Braunagel et al. |
| 2018/0370544 A1 | 12/2018 | Kitagawa |
| 2018/0373250 A1 | 12/2018 | Nakamura et al. |
| 2019/0005823 A1 | 1/2019 | Fujiki et al. |
| 2019/0026918 A1 | 1/2019 | Gomezcaballero et al. |
| 2019/0027040 A1 | 1/2019 | Ogama et al. |
| 2019/0047469 A1 | 2/2019 | Nishiguchi et al. |
| 2019/0047561 A1* | 2/2019 | Nishiguchi ........... B60W 30/12 |
| 2019/0049958 A1 | 2/2019 | Liu et al. |
| 2019/0061766 A1 | 2/2019 | Nishiguchi |
| 2019/0071099 A1 | 3/2019 | Nishiguchi |
| 2019/0106108 A1 | 4/2019 | Wienecke et al. |
| 2019/0126923 A1 | 5/2019 | Taie et al. |
| 2019/0126927 A1 | 5/2019 | Uejima |
| 2019/0135290 A1 | 5/2019 | Marden et al. |
| 2019/0155279 A1 | 5/2019 | Tayama |
| 2019/0161117 A1 | 5/2019 | Suzuki |
| 2019/0168754 A1 | 6/2019 | Makled et al. |
| 2019/0185005 A1* | 6/2019 | Fukuda ........... B60W 30/18163 |
| 2019/0196481 A1 | 6/2019 | Tay et al. |
| 2019/0197497 A1 | 6/2019 | Abari et al. |
| 2019/0212443 A1 | 7/2019 | Nomura et al. |
| 2019/0235504 A1 | 8/2019 | Carter et al. |
| 2019/0241158 A1 | 8/2019 | Ghannam et al. |
| 2019/0241198 A1 | 8/2019 | Mori et al. |
| 2019/0250620 A1 | 8/2019 | Huang et al. |
| 2019/0256064 A1 | 8/2019 | Hecker et al. |
| 2019/0263411 A1 | 8/2019 | Saikyo et al. |
| 2019/0265712 A1 | 8/2019 | Satzoda et al. |
| 2019/0279507 A1 | 9/2019 | Oshisaka et al. |
| 2019/0283757 A1 | 9/2019 | Honda et al. |
| 2019/0285726 A1 | 9/2019 | Muto |
| 2019/0291642 A1 | 9/2019 | Chae et al. |
| 2019/0291728 A1 | 9/2019 | Shalev-Shwartz et al. |
| 2019/0302763 A1 | 10/2019 | Kondo et al. |
| 2019/0302768 A1 | 10/2019 | Zhang et al. |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1 | 11/2019 | Zhu et al. |
| 2019/0391580 A1 | 12/2019 | Di Cairano et al. |
| 2020/0001714 A1 | 1/2020 | Kojima |
| 2020/0049513 A1 | 2/2020 | Ma |
| 2020/0073396 A1 | 3/2020 | Shimizu |
| 2020/0172123 A1 | 6/2020 | Kubota et al. |
| 2020/0180638 A1 | 6/2020 | Kanoh |
| 2020/0189618 A1 | 6/2020 | Ochida |
| 2020/0269747 A1 | 8/2020 | Kusayanagi et al. |
| 2020/0269880 A1 | 8/2020 | Tokita |
| 2020/0301431 A1 | 9/2020 | Matsubara et al. |
| 2020/0307634 A1 | 10/2020 | Yashiro |
| 2020/0312155 A1 | 10/2020 | Kelkar et al. |
| 2020/0339128 A1 | 10/2020 | Kanoh et al. |
| 2020/0391593 A1 | 12/2020 | Lee et al. |
| 2021/0188258 A1 | 6/2021 | Goto et al. |
| 2021/0188262 A1 | 6/2021 | Goto et al. |
| 2021/0188356 A1 | 6/2021 | Goto et al. |

FOREIGN PATENT DOCUMENTS

| | | |
|---|---|---|
| DE | 102004005815 B3 | 6/2005 |
| DE | 10 2004 048 468 A1 | 4/2006 |
| DE | 10 2007 005 245 A1 | 11/2007 |
| DE | 10 2011 016 770 A1 | 11/2011 |
| DE | 10 2011 016 771 A1 | 10/2012 |
| DE | 10 2012 001405 A1 | 11/2012 |
| DE | 10 2011 109618 A1 | 2/2013 |
| DE | 10 2012 008090 A1 | 10/2013 |
| DE | 10 2014 200896 A1 | 7/2015 |
| DE | 10 2014 225 680 A1 | 6/2016 |
| DE | 10 2015 205131 A1 | 9/2016 |
| DE | 102016202946 A1 | 9/2016 |
| DE | 102015206969 A1 | 10/2016 |
| DE | 102015209476 A1 | 11/2016 |
| DE | 102015219231 A1 | 4/2017 |
| DE | 10 2016 007187 A1 | 6/2017 |
| DE | 102015224244 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3 264 211 A1 | 1/2018 |
| EP | 3284646 A1 | 2/2018 |
| EP | 3075618 A3 | 5/2018 |
| EP | 19167267.4 | 8/2021 |
| JP | 2000-020898 A | 1/2000 |
| JP | 2000-198458 A | 7/2000 |
| JP | 2003-025868 A | 1/2003 |
| JP | 2008-515701 A | 5/2008 |
| JP | 2009-184554 A | 8/2009 |
| JP | 2015-066962 A | 4/2015 |
| JP | 2015-075889 A | 4/2015 |
| JP | 2015-138330 A | 7/2015 |
| JP | 2016-000602 A | 1/2016 |
| JP | 2016-011031 A | 1/2016 |
| JP | 2016-071513 A | 5/2016 |
| JP | 2016-151815 A | 8/2016 |
| JP | 2016-196285 A | 11/2016 |
| JP | 2016-207060 A | 12/2016 |
| JP | 2017-062696 A | 3/2017 |
| JP | 2017-100681 A | 6/2017 |
| JP | 2017-134664 A | 8/2017 |
| JP | 2017-138899 A | 8/2017 |
| JP | 2017-165322 A | 9/2017 |
| JP | 2017-210034 A | 11/2017 |
| JP | 2017-217969 A | 12/2017 |
| JP | 2018-047737 A | 3/2018 |
| JP | 2019-043169 A | 3/2019 |
| KR | 10-0578573 B2 | 5/2006 |
| KR | 10-2011-0065013 A | 6/2011 |
| KR | 10-2014-0082279 A | 7/2014 |
| KR | 10-1439017 B1 | 10/2014 |
| KR | 10-2016-0004835 A | 1/2016 |
| KR | 10-2016-0023850 A | 3/2016 |
| KR | 10-1779823 B | 10/2017 |
| KR | 10-2018-0022900 A | 3/2018 |
| KR | 10-2018-0023981 A | 3/2018 |
| KR | 10-2018-0070401 A | 6/2018 |
| KR | 10-2018-0095240 A | 8/2018 |

(56) References Cited

FOREIGN PATENT DOCUMENTS

| WO | 2010-088869 | A1 | 8/2010 |
|---|---|---|---|
| WO | 2012-131405 | A1 | 10/2012 |
| WO | 2014-154771 | A1 | 10/2014 |
| WO | 2017-018133 | A1 | 2/2017 |
| WO | WO 2017064941 | A1 | 4/2017 |
| WO | 2017-168013 | A1 | 10/2017 |
| WO | WO 2017168013 | A1 | 10/2017 |
| WO | 2018-033389 | A1 | 2/2018 |
| WO | 2017-017793 | A1 | 6/2018 |

OTHER PUBLICATIONS

European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Application No. 16/204,362, 27 pp.
U.S. Office Action dated Apr. 24, 2020 from the corresponding U.S. Application No. 16/203,884, 25 pp.
European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
Office Action dated Aug. 12, 2020 from the corresponding U.S. Appl. No. 16/192,279, 60 pages.
Notice of Allowance dated Sep. 4, 2020 from the corresponding U.S. Appl. No. 16/203,884, 15 pages.
Office Action dated Sep. 15, 2020 from the corresponding U.S. Appl. No. 16/206,170, 23 pages.
Office Action dated Dec. 10, 2020 from the corresponding U.S. Appl. No. 16/269,140, 31 pp.
Office Action dated Dec. 14, 2020 from the corresponding U.S. Appl. No. 16/378,203, 49 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279, 38 pp.
Notice of Allowance dated Jan. 25, 2021 from the corresponding U.S. Appl. No. 16/372,937, 31 pp.
Office Action dated Jan. 27, 2021 from the corresponding U.S. Appl. No. 16/299,547, 29 pp.
Office Action dated Feb. 11, 2021 from the corresponding U.S. Appl. No. 16/372,896, 26 pp.
Office Action dated Feb. 11, 2021 from the corresponding U.S. Appl. No. 16/376,661, 24 pp.
Office Action dated Feb. 17, 2021 from the corresponding U.S. Appl. No. 16/204,324, 30 pp.
Office Action dated Feb. 17, 2021 from the corresponding U.S. Appl. No. 16/376,576, 56 pp.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
U.S. Office Action for U.S. Appl. No. 16/204,362 dated Oct. 16, 2019, 32 pages.
Office Action dated Mar. 17, 2021 from the corresponding U.S. Appl. No. 16/378,181, 14 pp.
Notice of Allowance dated Mar. 23, 2021 from the corresponding U.S. Appl. No. 16/269,140, 9 pp.
Office Action dated Apr. 15, 2021 from the corresponding U.S. Appl. No. 16/290,376, 27 pp.
Office Action dated Apr. 22, 2021 from the corresponding U.S. Appl. No. 16/378,203, 35 pp.
Notice of Allowance dated May 19, 2021 from the corresponding U.S. Appl. No. 16/204,324, 13 pp.
Office Action dated May 21, 2021 from the corresponding U.S. Appl. No. 16/372,896, 19 pp.
Notice of Allowance dated May 27, 2021 from the corresponding U.S. Appl. No. 16/376,661, 10 pp.
Office Action dated Jun. 1, 2021 from the corresponding U.S. Appl. No. 16/192,279, 39 pp.

\* cited by examiner

APPARATUS AND METHOD FOR CONTROLLING DRIVING IN VEHICLE

CROSS-REFERENCE TO RELATED APPLICATION

The present application claims priority to and the benefit of Korean Patent Application No. 10-2018-0140866, filed in the Korean Intellectual Property Office on Nov. 15, 2018, which claims priority to and the benefit of U.S. Patent Application No. 62/655,831, filed on Apr. 11, 2018, the entire contents of which are incorporated herein by reference.

TECHNICAL FIELD

The present disclosure relates to an apparatus and method for providing a lane change function in a vehicle.

BACKGROUND

The statements in this section merely provide background information related to the present disclosure and may not constitute prior art.

With the development of the auto industry, an autonomous system and a driving assistance system which facilitates partially autonomous driving (hereinafter, for convenience of description, both of autonomous driving and driving assistance are referred to as "autonomous driving") have been developed. The autonomous system may provide a variety of functions, for example, setting speed keeping, vehicle-to-vehicle distance keeping, lane keeping, and a lane change. The autonomous system may perform autonomous driving using various devices such as a sensor for sensing environments outside the vehicle, a sensor for sensing information about the vehicle, a global positioning system (GPS), a detailed map, a driver state monitoring system, a steering actuator, an acceleration/deceleration actuator, a communication circuit, and a control circuit (e.g., an electronic control unit (ECU)). The autonomous system may perform a lane change based on, for example, an input of a driver.

When the lane change is performed, there may be a need for a control strategy capable of ensuring the safety of a driver of a vehicle which performs the lane change and a driver of a surrounding vehicle. For example, while the lane change is performed, a limited time for detailed operations for the lane change may be set. The safety of the driver of the vehicle and the driver of the surrounding vehicle may be ensured by the limited time.

SUMMARY

An aspect of the present disclosure provides an apparatus and method for performing a vehicle control strategy capable of ensuring the safety of a vehicle and a surrounding vehicle while performing a lane change.

The technical problems to be solved by the present inventive concept are not limited to the aforementioned problems, and any other technical problems not mentioned herein will be clearly understood from the following description by those skilled in the art to which the present disclosure pertains.

In some forms of the present disclosure, an apparatus for controlling driving in a vehicle may include: one or more input devices configured to receive an input from a driver of the vehicle and a control circuit configured to be electrically connected with the one or more input devices. The control circuit may be configured to enable a lane change, when a first input of the driver for the lane change is received via the one or more input devices, initiate lateral movement for the lane change, when a second input of the driver for the lane change is received via the one or more input devices within a first time interval after the first input is received, and cancel the lane change, when the second input is not received within the first time interval after the first input is received.

In some forms of the present disclosure, the control circuit may be configured to cancel the lane change, when the second input is received within a second time interval shorter than the first time interval after the first input is received.

In some forms of the present disclosure, the control circuit may be configured to calculate a lateral remaining distance for the lane change based on a progress rate of the lane change.

In some forms of the present disclosure, the control circuit may be configured to initialize the progress rate of the lane change, when the first input is received.

In some forms of the present disclosure, the control circuit may be configured to control the vehicle to maintain the initialized progress rate of the lane change until the second input is received after the first input is received.

In some forms of the present disclosure, the control circuit may be configured to calculate the progress rate of the lane change based on a time elapsed after the lateral movement is initiated and a target time of the lane change.

In some forms of the present disclosure, the control circuit may be configured to adjust a speed of the lane change based on a time elapsed after the lane change is enabled and whether the vehicle approaches a line in the direction of a target lane of the lane change.

In some forms of the present disclosure, the control circuit may be configured to adjust a target time of the lane change based on a time elapsed after the lane change is enabled and whether the vehicle approaches a line in the direction of a target lane of the lane change.

In some forms of the present disclosure, the control circuit may be configured to adjust a speed of the lane change based on an expected time to approach a line in the direction of a target lane of the lane change.

In some forms of the present disclosure, the control circuit may be configured to adjust a target time of the lane change based on an expected time to approach a line in the direction of a target lane of the lane change.

In some forms of the present disclosure, the control circuit may be configured to calculate an expected time to approach a line, based on a time elapsed after the lane change is enabled, a target time of the lane change, a distance between the line in the direction of a target lane of the lane change and the vehicle, and a lane width.

In some forms of the present disclosure, the control circuit may be configured to cancel the lane change, when a time elapsed after the lane change is enabled is greater than a third time interval and before the vehicle approaches a line in the direction of a target lane of the lane change.

In some forms of the present disclosure, the control circuit may be configured to provide a warning to the driver, when a time elapsed after the lane change is enabled is greater than a third time interval and after the vehicle approaches a line in the direction of a target lane of the lane change.

In some forms of the present disclosure, a method for controlling driving in a vehicle may include: enabling a lane change, when a first input of a driver of the vehicle for the lane change is received, initiating lateral movement for the lane change, when a second input of the driver for the lane change is received within a first time interval after the first input is received, and cancelling the lane change, when the second input is not received within the first time interval after the first input is received.

In some forms of the present disclosure, the method may further include cancelling the lane change, when the second input is received within a second time interval shorter than the first time interval after the first input is received.

In some forms of the present disclosure, the method may further include adjusting a speed of the lane change based on a time elapsed after the lane change is enabled and whether the vehicle approaches a line in the direction of a target lane of the lane change.

In some forms of the present disclosure, the method may further include adjusting a target time of the lane change based on a time elapsed after the lane change is enabled and whether the vehicle approaches a line in the direction of a target lane of the lane change.

In some forms of the present disclosure, the method may further include adjusting a speed of the lane change based on an expected time to approach a line in the direction of a target lane of the lane change.

In some forms of the present disclosure, the method may further include adjusting a target time of the lane change based on an expected time to approach a line in the direction of a target lane of the lane change.

In some forms of the present disclosure, the method may further include cancelling the lane change, when a time elapsed after the lane change is enabled is greater than a third time interval and before the vehicle approaches a line in the direction of a target lane of the lane change.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing elements of some forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
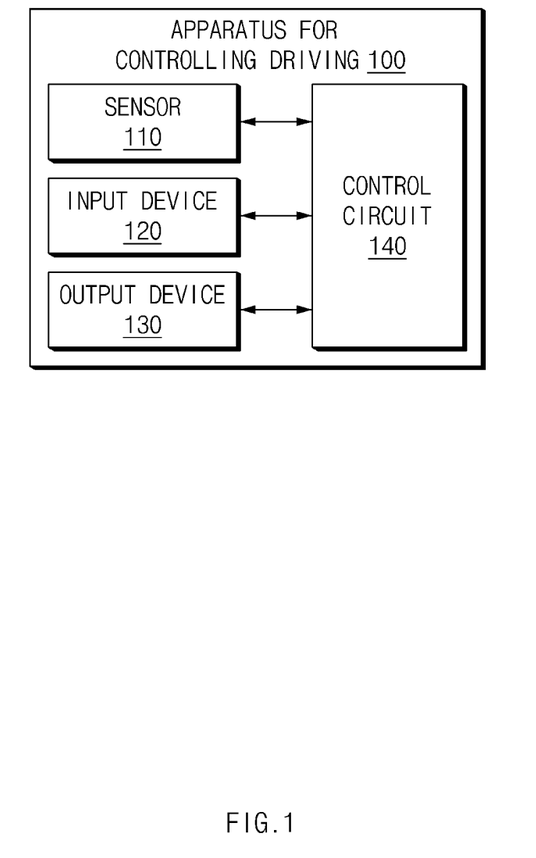
FIG. 1 is a block diagram illustrating a configuration of an apparatus for controlling driving in a vehicle in one form of the present disclosure.

FIG. 1 is a block diagram illustrating a configuration of an apparatus for controlling driving in a vehicle in some forms of the present disclosure.

Referring to FIG. 1, an apparatus 100 for controlling driving in a vehicle in some forms of the present disclosure may include a sensor 110, an input device 120, an output device 130, and a control circuit 140. The apparatus 100 for controlling the driving in FIG. 1 may be a portion of an autonomous system and may be loaded into the vehicle.

The sensor 110 may be configured to sense information about the outside of the vehicle and information about the vehicle loaded with the apparatus 100 for controlling the driving. The sensor 110 may sense a preceding vehicle, a following vehicle, a line on a road, an external object, and the like and may sense a speed, a steering angle, a wheel speed, a yaw rate, and the like.

The input device 120 may be configured to receive an input from a driver of the vehicle. The input device 120 may be configured to receive, for example, a lane change command from the driver. The input device 120 may include two or more input devices. The two or more input devices may be the same type of input devices or different types of input devices.

The output device 130 may be configured to output information sensible by the driver in the vehicle. The output device 130 may include, for example, a speaker, a display, a vibration motor, and/or the like.

Although not illustrated in FIG. 1, the apparatus 100 for controlling the driving may further include a steering device, an acceleration device, a deceleration device, and the like.

The control circuit 140 may be electrically connected with the sensor 110, the input device 120, and the output device 130. The control circuit 140 may control the sensor 110, the input device 120, and the output device 130 and may perform a variety of data processing and various arithmetic operations. The control circuit 140 may be, for example, an electronic control unit (ECU), a micro controller unit (MCU), or a sub-controller, which is loaded into the vehicle.

In some forms of the present disclosure, the control circuit 140 may perform lane keeping control. The control circuit 140 may perform the lane keeping control using, for example, a driving assistance system, an autonomous system, or the like on a limited-access road.

In some forms of the present disclosure, the control circuit 140 may receive a first input of the driver for a lane change via the input device 120. For example, the control circuit 140 may receive an input to a turn signal lever, a steering wheel, a switch, or a button of the vehicle, as an intentional act of the driver for the lane change.

In some forms of the present disclosure, when the first input is received, the control circuit 140 may enable the lane change. When the lane change is enabled, the control circuit 140 may continue performing the lane keeping control without lateral movement during a specified time interval. When the lane change is enabled, the control circuit 140 may turn on/off a turn signal. As the control circuit 140 continues performing the lane keeping control without the lateral movement together with turning on/off the turn signal, the apparatus 100 for controlling the driving may notify a surrounding vehicle of an intention to perform the lane change and may ensure the safety of the lane change.

In some forms of the present disclosure, after the first input is received, the control circuit 140 may receive a second input via the input device 120. For example, the control circuit 140 may receive an input to the turn signal lever, the steering wheel, the switch, or the button, as an intentional act of the driver for the lane change. The second input may be received via the device which provides the first input or may be received via a device different from the device which provides the first input. By receiving the first input and the second input, the apparatus 100 for controlling the driving may accurately recognize an intention of the driver to perform the lane change.

In some forms of the present disclosure, when the second input of the driver for the lane change is received via the input device 120 within a first time interval after the first input is received, the control circuit 140 may initiate lateral movement for the lane change. When the second input is received within a specified time (e.g., 5 seconds, 10 seconds, or the like) after the lane change is enabled, the control circuit 140 may initiate lateral movement in the direction of a target lane of the lane change.

In some forms of the present disclosure, when the second input is not received within the first time interval after the first input is received, the control circuit 140 may cancel the lane change. When it is excessively late to initiate lateral movement after the lane change is enabled, it may be difficult to ensure the safety of the lane change. Thus, when the second input is not received within a specified time after the lane change is enabled, the control circuit 140 may fail to perform the lane change.

In some forms of the present disclosure, when the second input is received within a second time interval shorter than the first time interval after the first input is received, the control circuit 140 may cancel the lane change. To notify a surrounding vehicle of an intention to perform the lane change and ensure the safety of the lane change, the control circuit 140 may continue the lane keeping control without lateral movement over a specified time (e.g., 1 second or 3 seconds). Thus, when the second input is received within the second time interval after the first input is received, because it is difficult to ensure the safety of the lane change, the control circuit 140 may cancel the lane change. In some forms of the present disclosure, when the second input is received within the second time interval shorter than the first time interval after the first input is received, the control circuit 140 may initiate lateral movement after the second time interval.

After the lateral movement for the lane change is initiated, the control circuit 140 may provide a suitable control strategy in consideration of a state of the lane change. To determine the state of the lane change, the control circuit 140 may obtain or calculate various values, for example, a progress rate of the lane change, a lateral remaining distance, an elapsed time, a target time of the lane change, an expected time to approach a line, and/or a distance between the vehicle and the line. The control circuit 140 may provide a suitable control strategy based on the obtained or calculated values. By using the above-mentioned various values, although a condition such as the first time interval or the second time interval is changed, the control circuit 140 may be flexible in response to the changed condition.

In some forms of the present disclosure, the control circuit 140 may calculate a lateral remaining distance for the lane change based on the progress rate of the lane change. For example, the control circuit 140 may calculate the progress rate of the lane change based on the time elapsed after the lateral movement is initiated and the target time of the lane change. The control circuit 140 may calculate the lateral remaining distance based on a quintic function for the progress rate of the lane change. A description will be given in detail of a detailed method for calculating the progress rate of the lane change, the lateral remaining distance, and the like.

In some forms of the present disclosure, when the first input is received, the control circuit 140 may initialize the progress rate of the lane change. For example, the control circuit 140 may set the progress rate of the lane change to "0". In some forms of the present disclosure, the control circuit 140 may control the vehicle to maintain the initialized progress rate of the lane change until the second input is received after the first input is received. For example, the control circuit 140 may continue performing the lane keeping control without lateral movement until the second input is received.

In some forms of the present disclosure, the control circuit 140 may adjust a speed of the lane change based on a time elapsed after the lane change is enabled and whether the vehicle approaches a line in the direction of a target lane of the lane change. In some forms of the present disclosure, when the time elapsed after the lane change is enabled is greater than a third time interval and before the vehicle approaches the line in the direction of the target lane of the lane change, the control circuit 140 may cancel the lane change. For example, when the time elapsed after the lane change is enabled is greater than a specified value (e.g., 5 seconds or 10 seconds) and when the vehicle does not approach the line, the control circuit 140 may cancel the lane change. For another example, when the time elapsed after the lane change is enabled is greater than the specified value and when the vehicle does not approach the line, the control circuit 140 may adjust a speed of the lane change in consideration of a current situation or may maintain the speed of the lane change.

In some forms of the present disclosure, the control circuit 140 may adjust a target time of the lane change based on the time elapsed after the lane change is enabled and whether the vehicle approaches the line in the direction of the target lane of the lane change. The control circuit 140 may adjust a speed of the lane change by adjusting the target time of the lane change. When the target time of the lane change is reduced, the speed of the lane change may be increased. When the target time for the lane change is increased, the speed of the lane change may be reduced.

In some forms of the present disclosure, the control circuit 140 may adjust a speed of the lane change based on an expected time to approach the line in the direction of the target lane of the lane change. For example, when the expected time to approach the line is shorter than a specified time (e.g., seconds), the control circuit 140 may reduce a speed of the lane change. For another example, when the expected time to approach the line is longer than a specified time (e.g., 5 seconds or 10 seconds), the control circuit 140 may increase a speed of the lane change. In some forms of the present disclosure, the control circuit 140 may calculate an expected time to approach the line, based on the time elapsed after the lane change is enabled, the target time of the lane change, the distance between the line in the direction of the target lane of the lane change and the vehicle, and the lane width. A description will be given in detail of a detailed method for calculating the expected time to approach the line with reference to FIG. 4.

In some forms of the present disclosure, the control circuit 140 may adjust a target time of the lane change based on the expected time to approach the line in the direction of the target lane of the lane change. The control circuit 140 may adjust a speed of the lane change by adjusting the target time of the lane change.

By changing the target time of the lane change, the control circuit 140 may provide a flexible correspondence according a progress situation to the driver while performing the lane change.

In some forms of the present disclosure, when the time elapsed after the lane change is enabled is greater than a third time interval and when the vehicle approaches the line in the direction of the target lane of the lane change, the control circuit 140 may provide a warning to the driver. After at least one wheel of the vehicle approaches the line, because continuing performing the lane change preferably helps ensure the safety of the lane change, the control circuit 140 may provide a warning to the driver using the output device 130 while maintaining the lane change.

Figure 2:
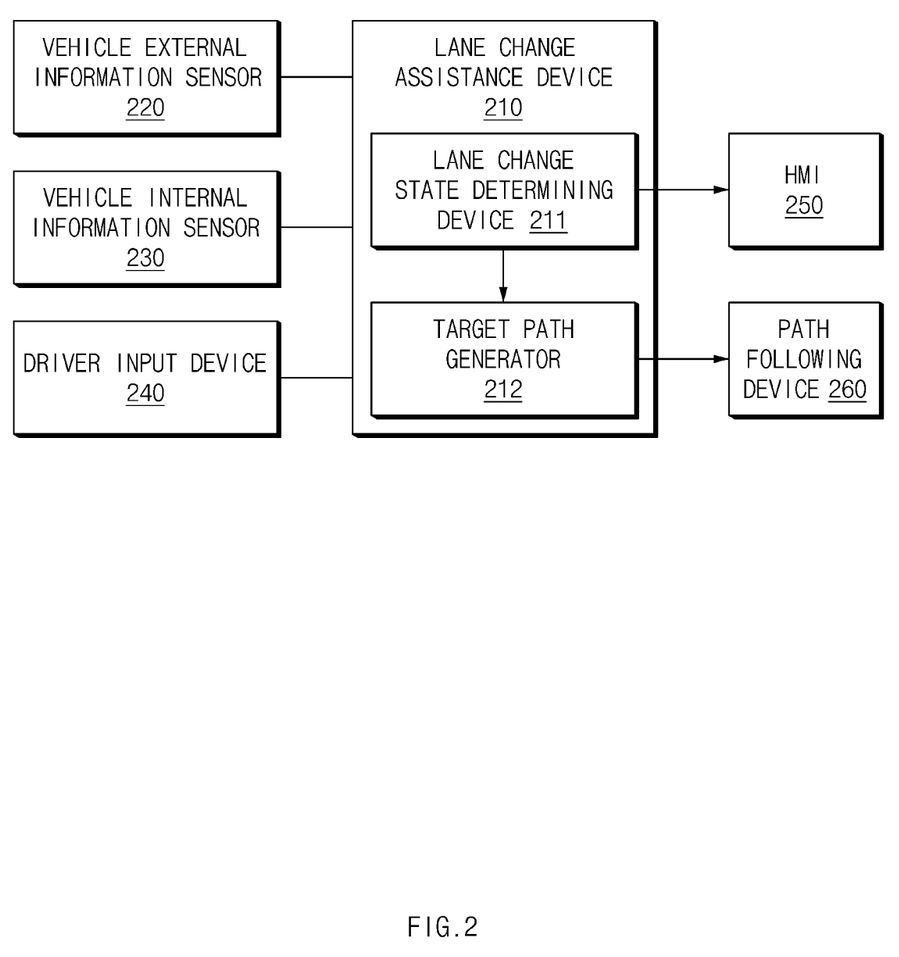
FIG. 2 is a block diagram illustrating a configuration included in a vehicle in one form of the present disclosure.

FIG. 2 is a block diagram illustrating a configuration included in a vehicle in some forms of the present disclosure.

Referring to FIG. 2, the vehicle may include a lane change assistance device 210, a vehicle external information sensor 220, a vehicle internal information sensor 230, a driver input device 240, a human machine interface (HMI) 250, and a path following device 260.

The lane change assistance device 210 may be loaded into the vehicle. The lane change assistance device 210 may determine whether it is possible to perform lane change control in response to an input of a driver of the vehicle and may perform steering control and acceleration/deceleration control for the lane change control. The lane change assistance device 210 may include a lane change state determining device 211 and a target path generator 212. The lane change state determining device 211 may determine a state associated with a lane change in overall consideration of whether there is an input of the driver and whether it is possible to perform the lane change. The target path generator 212 may generate a path on which the vehicle is suitable to travel, depending on the lane change state.

The vehicle external information sensor 220 may include sensors, such as a camera, a radar, and a light detection and ranging (LiDAR), for sensing a line and an object, and a sensor, such as a navigation device, for determining properties of a driving road of the vehicle.

The vehicle internal information sensor 230 may detect a state where the vehicle is traveling and may include an acceleration sensor, a yaw rate sensor, and the like.

The driver input device 240 may include a means, such as a switch and a steering torque sensor, for detecting an intentional act of the driver for a steering system.

The HMI 250 may display a screen such that the driver recognizes a lane change state in the vehicle.

The path following device 260 may perform control for following a target path through control of an actuator such as a motor driven power steering system (MDPS) or electronic stability control (ESC).

Figure 3:
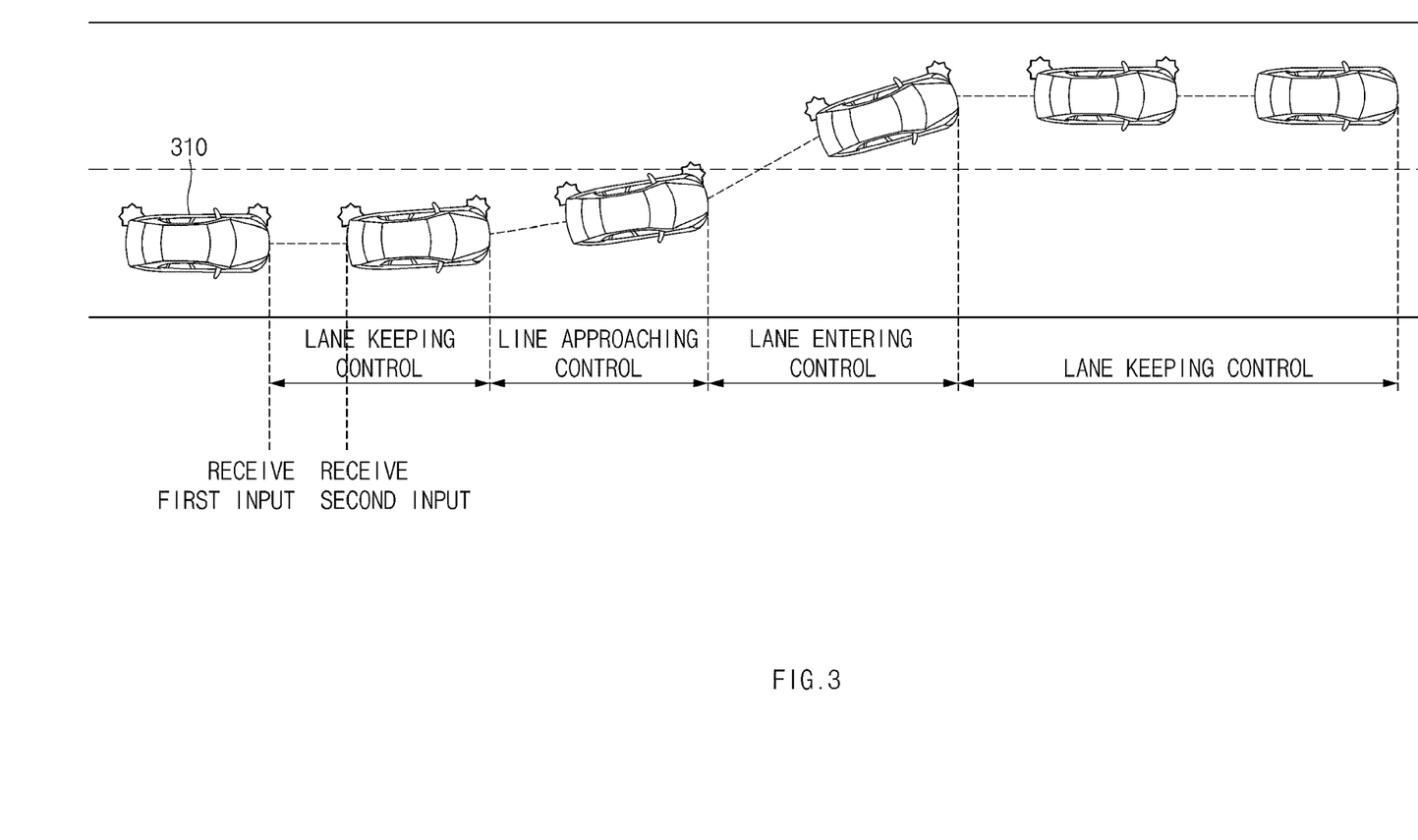
FIG. 3 is a drawing illustrating an exemplary operation of an apparatus for controlling driving in a vehicle in one form of the present disclosure.

FIG. 3 is a drawing illustrating an exemplary operation of an apparatus for controlling driving in a vehicle in some forms of the present disclosure.

Referring to FIG. 3, a vehicle 310 may perform a lane change toward a target lane from its driving lane. When a first input is received, the vehicle 310 may turn on/off a left turn signal. The vehicle 310 may perform lane keeping control during at least a first time interval after the first input is received. When a second input is received within the first time interval, the vehicle 310 may cancel the lane change, or may continue performing the lane keeping control during the first time interval and may initiate line approaching control. When the second input is received after the first time interval, the vehicle 310 may immediately initiate the line approaching control.

The vehicle 310 may perform the line approaching control toward a line between the driving lane and the target lane. The vehicle 310 may move toward the line in a lateral direction. The vehicle 310 may complete the line approaching control within a second time interval. While performing the line approaching control, the vehicle 310 may adjust a speed of the lane change or a target speed of the lane change, depending on a lane change situation.

When the line approaching control is completed, the vehicle 310 may perform lane entering control. When the lane entering control is performed, a wheel of the vehicle 310 passes the line. The vehicle 310 may move toward the target lane in the lateral direction. The lane entering control may continue until all wheels of the vehicle 310 pass the line after the wheel of the vehicle 310 starts to pass the line. While performing the lane entering control, the lane 310 may provide a warning to a driver of the vehicle 310 depending on a lane change situation.

When the lane entering control is completed, the lane 310 may perform lane keeping control. The lane 310 may move toward the center of the target lane in the lateral direction. When the vehicle 310 moves to the center of the target lane, it may turn off the left turn signal.

Figure 4:
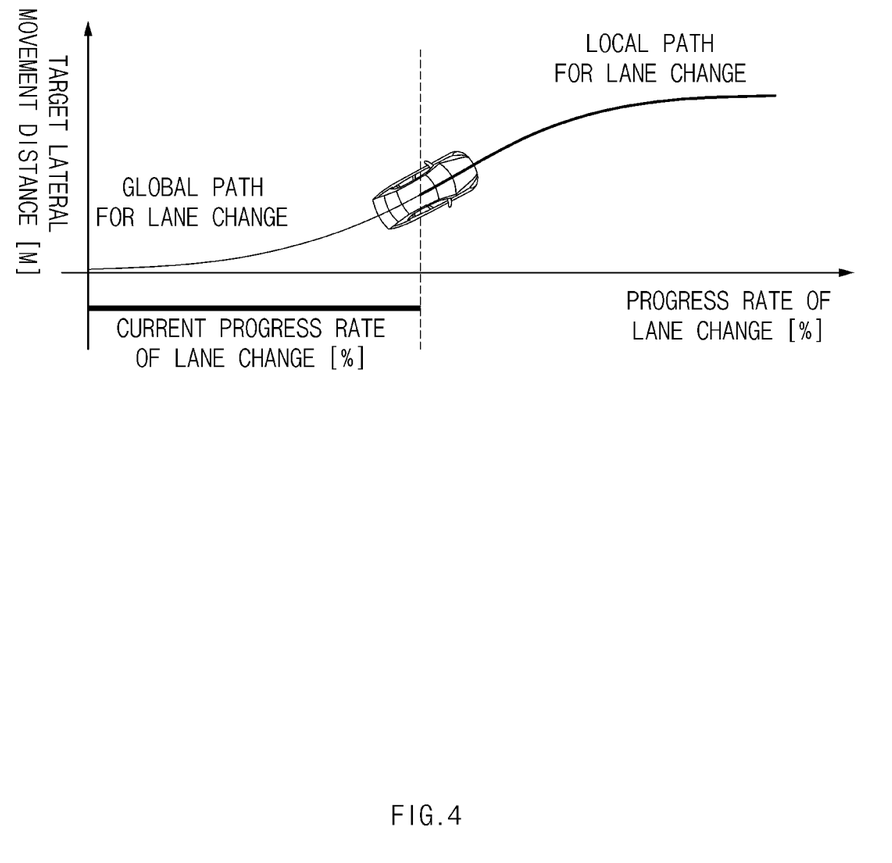
FIG. 4 is a drawing illustrating an exemplary operation of an apparatus for controlling driving in a vehicle in one form of the present disclosure.

FIG. 4 is a drawing illustrating an exemplary operation of an apparatus for controlling driving in a vehicle in some forms of the present disclosure.

Referring to FIG. 4, the vehicle may generate a local path for a lane change according to a lane change state. The local path for the lane change may be a path after a path where the vehicle travels currently from a global path for the lane change. The global path for the lane change may be represented based on a progress rate of the lane change and a target lateral movement distance. A relationship equation between the progress rate of lane change and the target lateral movement distance may be obtained in the form of a quintic function and may be specified by 6 boundary conditions. The 6 boundary conditions may be "start lateral location=0", "start heading angle=0", "start curvature=0", "end lateral location=lane width", "end heading angle=0", and "end curvature=0". An exemplary relationship equation between the target lateral movement distance and the progress rate LC_rate of the lane change may be Equation 1 below.

$$\text{Target lateral movement distance} = 6*\text{lane width}*LC\_rate^5 - 15*\text{lane width}*LC\_rate^4 + 10*\text{lane width}*LC\_rate^3 \quad \text{[Equation 1]}$$

The progress rate of the lane change may be initialized, maintained, or increased according to a state of the lane change. The progress rate of the lane change may be calculated by dividing a time LC_ElapsedTime elapsed after line approaching control is initiated by a target time DT_LC of a lane change. The target time of the lane change may be a time to perform line approaching control and lane entering control and may refer to a time to perform lateral movement during the lane change. By changing the target time of the lane change, a speed of the lane change may be adjusted. A description will be given of the adjustment of the target time of the lane change with reference to FIG. 6.

Figure 5:
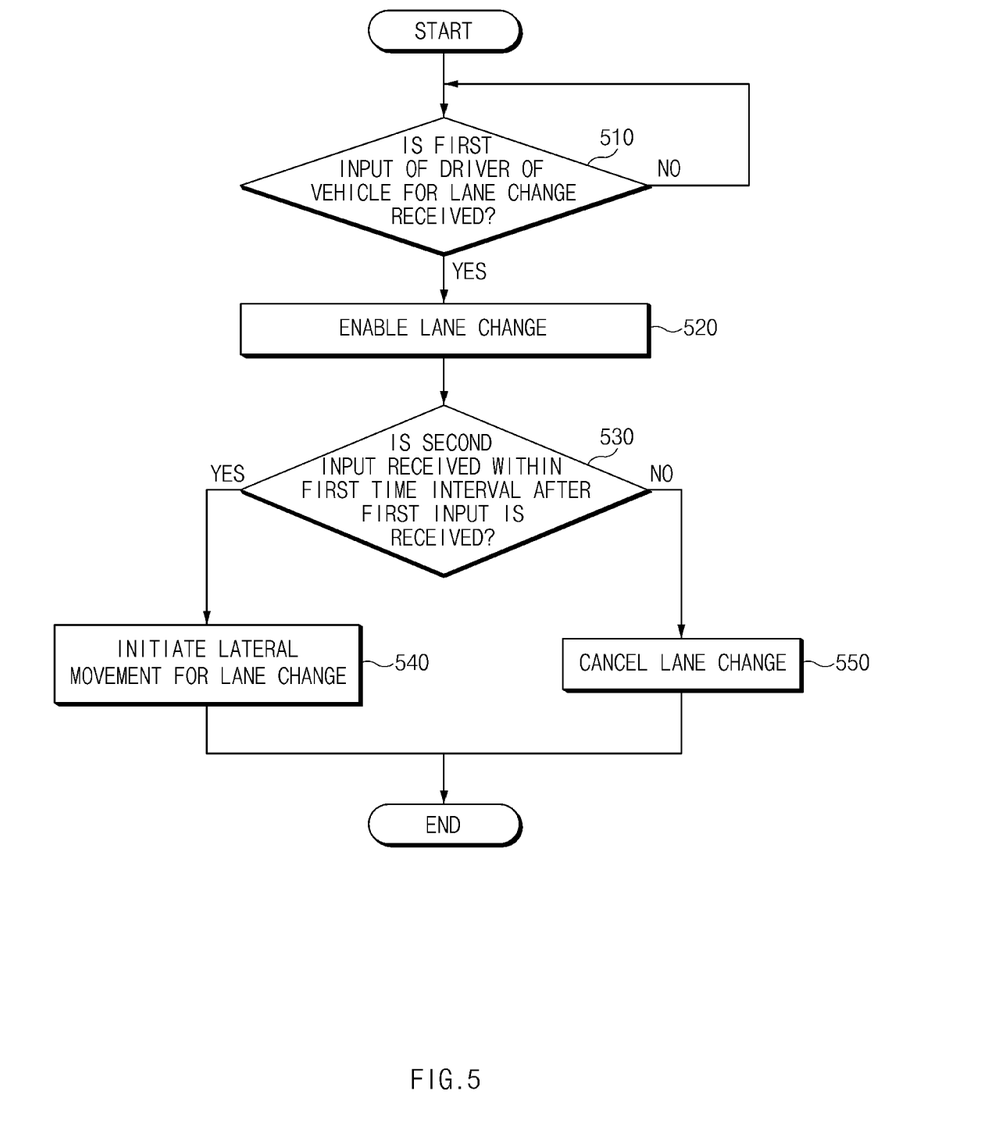
FIG. 5 is a flowchart illustrating a method for controlling driving in a vehicle in one form of the present disclosure.

FIG. 5 is a flowchart illustrating a method for controlling driving in a vehicle in some forms of the present disclosure.

Hereinafter, it is assumed that a vehicle including an apparatus 100 for controlling driving in FIG. 1 performs a process of FIG. 5. Furthermore, in a description of FIG. 5, an operation described as being performed by the vehicle may be understood as being controlled by a control circuit 140 of the apparatus 100 for controlling the driving.

Referring to FIG. 5, in operation 510, the vehicle may receive a first input of its driver for a lane change. The vehicle may perform lane keeping control until the first input is received.

When the first input is received, in operation 520, the vehicle may enable the lane change. The vehicle may continue performing the lane keeping control during a specified time after the lane change is enabled and may turn on/off a turn signal.

In operation 530, the vehicle may determine a second input is received within a first time interval after the first input is received. The vehicle may receive the second input corresponding to an intention of the driver to perform the lane change.

When the second input is received within the first time interval, in operation 540, the vehicle may initiate lateral movement for the lane change. The vehicle may move in the direction of a target lane of the lane change.

When the second input is not received within the first time interval, in operation 550, the vehicle may cancel the lane change.

Figure 6:
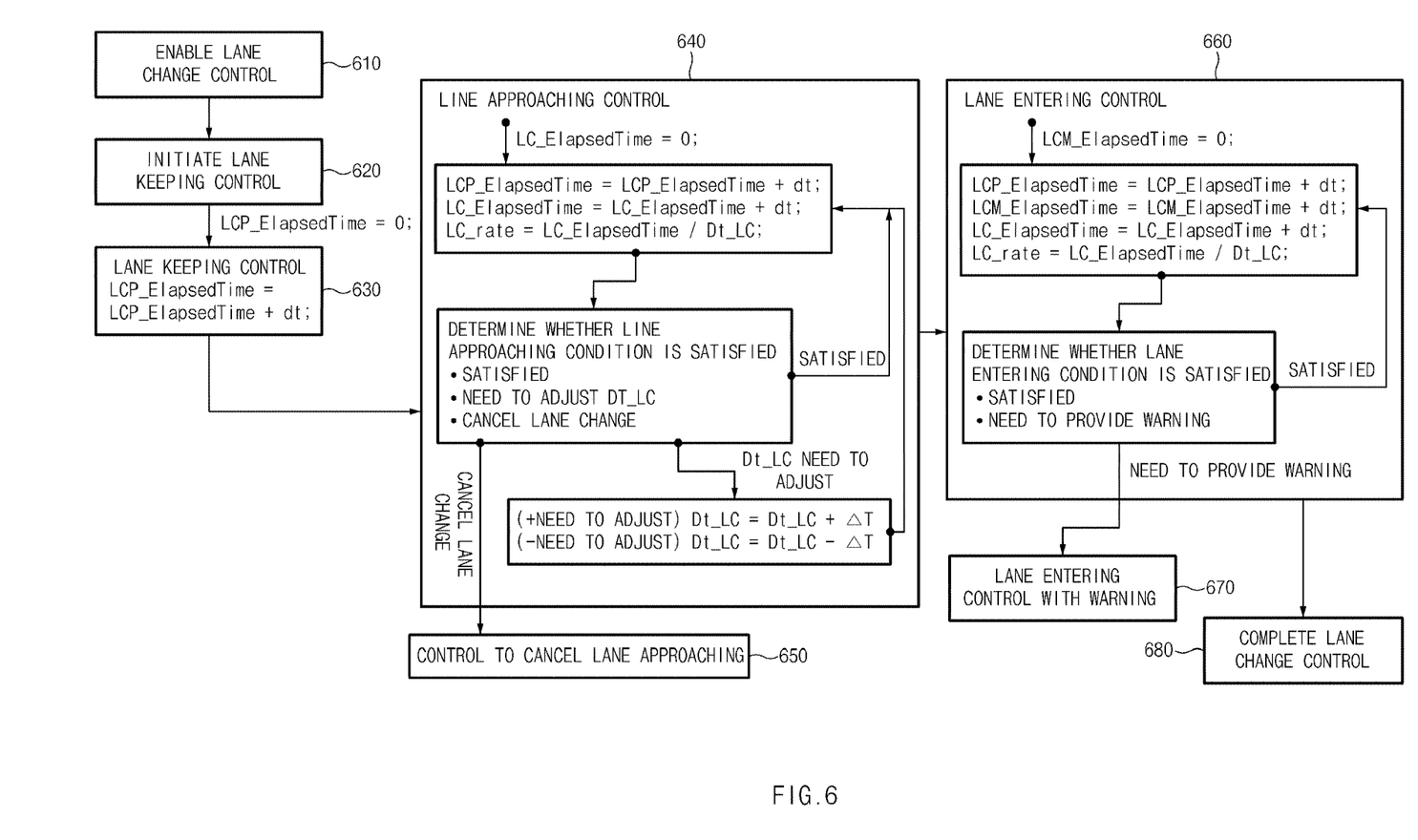
FIG. 6 is a flowchart illustrating a method for controlling driving in a vehicle in one form of the present disclosure.

FIG. 6 is a flowchart illustrating a method for controlling driving in a vehicle in some forms of the present disclosure.

Hereinafter, it is assumed that a vehicle including an apparatus 100 for controlling driving in FIG. 1 performs a process of FIG. 6. Furthermore, in a description of FIG. 6, an operation described as being performed by the vehicle may be understood as being controlled by a control circuit 140 of the apparatus 100 for controlling the driving.

Referring to FIG. 6, in operation 610, the vehicle may enable lane change control.

In operation 620, the vehicle may initiate lane keeping control. When the lane change control is enabled, the vehicle may initiate the lane keeping control and may initialize a time LCP_ElapsedTime elapsed after a lane change is enabled as "0".

In operation 630, the vehicle may perform the lane keeping control. LCP_ElapsedTime may increase during the lane keeping control.

In operation 640, the vehicle may perform line approaching control. When the line approaching control (or lateral movement) is initiated, the vehicle may initialize a time LC_ElapsedTime elapsed after the lateral movement is initiated as LCP_ElapsedTime and LC_ElapsedTime may increase during the line approaching control. A progress rate LC_rate of a lane change may be calculated with LC_ElapsedTime /Dt_LC. Dt_LC denotes a target time of the lane change.

When LCP_ElapsedTime is greater than a specified time (e.g., 5 seconds or 10 seconds), the vehicle may cancel the lane change. In this case, in operation 650 may control to cancel lane approaching.

When an expected time to approach a line is less than a specified time (e.g., 3 seconds), the vehicle may increase Dt_LC by ΔT. When the expected time to approach the line is greater than a specified time (e.g., 5 seconds or 10 seconds), the vehicle may decrease Dt_LC by ΔT. The expected time to approach the line may be calculated with "LCP_ElapsedTime+Dt_LC (Line2Tyre/W_lane)", where Line2Tyre is the distance between the line and the tyre which is nearest to the line and W_lane is the lane width. By changing Dt_LC, the vehicle may perform the line approaching control while satisfying a time condition.

The vehicle may determine that a line approaching condition is met except for the above-mentioned cases and may maintain current DT_LC.

While performing the lane approaching control and lane entering control, the vehicle may perform the lane change while gradually increasing LC_rate to "1".

In operation 660, the vehicle may perform the lane entering control. When the line approaching control is completed, the vehicle may perform the lane entering control and may initialize a time LCM_ElapsedTime elapsed after the lane entering control is initiated as "0". LCP_ElapsedTime, LC_ElapsedTime, and LCM_ElapsedTime may increase during the lane entering control. The progress rate LC_rate of the lane change may be calculated with "LC_Elapsed Time/Dt_LC".

When LCM_ElapsedTime is greater than a specified time (e.g., 5 seconds), in operation 670, the vehicle may perform the lane entering control together with providing a warning.

When LCM_ElapsedTime is less than or equal to the specified time (e.g., 5 seconds), the vehicle may determine that a lane entering condition is met and may perform the lane entering control.

In operation 680, the vehicle may complete the lane change control.

Figure 7:
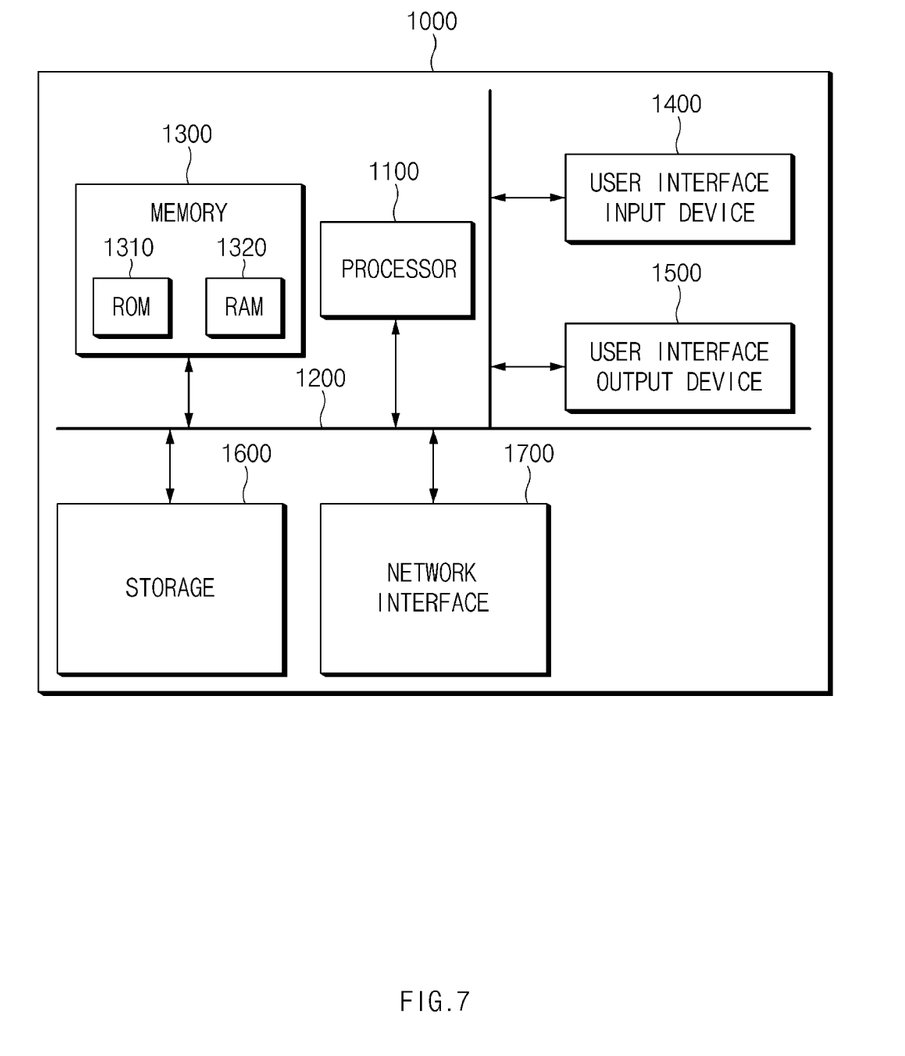
FIG. 7 is a block diagram illustrating a configuration of a computing system in one form of the present disclosure.

FIG. 7 is a block diagram illustrating a configuration of a computing system in some forms of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for performing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in some forms of the present disclosure disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for controlling the driving in the vehicle in some forms of the present disclosure may enhance the safety of the driver by providing a lane change strategy capable of considering a specified limited time.

Furthermore, the apparatus for controlling the driving in the vehicle in some forms of the present disclosure may be flexible in response to various situations upon a lane change by suitably adjusting a speed of the lane change over a limited time or providing a warning to the driver.

In addition, various effects directly or indirectly ascertained through the present disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for controlling driving in a vehicle, the apparatus comprising:
    one or more input devices configured to receive an input from a driver of the vehicle; and
    a control circuit electrically connected with the one or more input devices and configured to:
        activate a lane change when a first input for the lane change is received via the one or more input devices;
        initiate a lateral movement of the vehicle for the lane change when a second input for the lane change is received via the one or more input devices within a first time interval after the first input and not within a second time interval after the first input;
        cancel the lane change when the second input is not received within the first time interval after the first input; and
        cancel the lane change when the second input is received within the second time interval after the first input,
    wherein the second time interval is shorter than the first time interval.

2. The apparatus of claim 1, wherein the control circuit is further configured to:
    calculate a lateral remaining distance for the lane change based on a progress rate of the lane change.

3. The apparatus of claim 2, wherein the control circuit is configured to:
    initialize the progress rate of the lane change when the first input is received.

4. The apparatus of claim 3, wherein the control circuit is configured to:
    control the vehicle to maintain the initialized progress rate of the lane change until the second input is received after the first input.

5. The apparatus of claim 2, wherein the control circuit is further configured to calculate the progress rate of the lane change based on a time elapsed after the lateral movement and a target time of the lane change.

6. The apparatus of claim 1, wherein the control circuit is further configured to adjust a speed of the lane change based on a time elapsed after activating the lane change and whether the vehicle approaches a line toward a direction of a target lane of the lane change.

7. The apparatus of claim 1, wherein the control circuit is further configured to adjust a target time of the lane change based on a time elapsed after activating the lane change and whether the vehicle approaches a line toward a direction of the target lane.

8. The apparatus of claim 1, wherein the control circuit is further configured to adjust a speed of the lane change based on an expected time to approach a line toward a direction of the target lane.

9. The apparatus of claim 1, wherein the control circuit is further configured to adjust a target time of the lane change based on an expected time to approach a line toward a direction of the target lane.

10. The apparatus of claim 1, wherein the control circuit is further configured to calculate an expected time to approach a line toward a direction of the target lane based on:
    a time elapsed after activating the lane change;
    a target time of the lane change;
    a distance between the line toward the direction of the target lane and the vehicle; and
    a lane width.

11. The apparatus of claim 1, wherein the control circuit is further configured to cancel the lane change when
    a time elapsed after activating the lane change is greater than a third time interval; and
    before the vehicle approaches a line toward a direction of the target lane.

12. The apparatus of claim 1, wherein the control circuit is further configured to provide a warning to the driver when
    a time elapsed after activating the lane change is greater than a third time interval; and
    after the vehicle approaches a line toward a direction of the target lane.

13. A method for controlling driving in a vehicle, the method comprising:
    activating, with a control circuit, a lane change when a first input for the lane change is received;
    initiating, with the control circuit, a lateral movement for the lane change when a second input for the lane change is received within a first time interval after the first input and not within a second time interval after the first input;
    cancelling, with the control circuit, the lane change when the second input is not received within the first time interval after the first input; and
    cancelling, with the control circuit, the lane change when the second input is received within the second time interval after the first input,
    wherein the second time interval is shorter than the first time interval.

14. The method of claim 13, wherein the method further comprises:
    adjusting, with the control circuit, a speed of the lane change based on a time elapsed after activating the lane change and whether the vehicle approaches a line toward a direction of a target lane of the lane change.

15. The method of claim 13, wherein the method further comprises:
    adjusting, with the control circuit, a target time of the lane change based on a time elapsed after activating the lane change and whether the vehicle approaches a line toward a direction of the target lane.

16. The method of claim 13, wherein the method further comprises:
- adjusting, with the control circuit, a speed of the lane change based on an expected time to approach a line toward a direction of the target lane.

17. The method of claim 13, wherein the method further comprises:
- adjusting, with the control circuit, a target time of the lane change based on an expected time to approach a line toward a direction of the target lane.

18. The method of claim 13, wherein the method further comprises:
- when a time elapsed after activating the lane change is greater than a third time interval and before the vehicle approaches a line toward a direction of the target lane, cancelling, with the control circuit, the lane change.

\* \* \* \* \*